Dec. 25, 1934.  R. H. SMITH ET AL  1,985,266
AIRCRAFT NAVIGATIONAL INSTRUMENT
Filed April 7, 1932   2 Sheets-Sheet 1

INVENTORS
ROBERT HALL SMITH
JOHN P. W. VEST
BY
ATTORNEY

Dec. 25, 1934.   R. H. SMITH ET AL   1,985,266
AIRCRAFT NAVIGATIONAL INSTRUMENT
Filed April 7, 1932    2 Sheets-Sheet 2

INVENTORS
ROBERT HALL SMITH
JOHN P. W. VEST
BY
ATTORNEY

Patented Dec. 25, 1934

1,985,266

UNITED STATES PATENT OFFICE 1,985,266

AIRCRAFT NAVIGATIONAL INSTRUMENT

Robert Hall Smith and John P. W. Vest, United States Navy

Application April 7, 1932, Serial No. 603,837

3 Claims. (Cl. 73—151)

(Granted under the act of March 3, 1883, as amended April 30, 1928; 370 O. G. 757)

This invention relates to navigational instruments, and more particularly to an aircraft relative-position indicator by which a pilot in an aircraft can see at a glance his bearing and distance from an aircraft carrier or other base of operation. This apparatus is an improvement over the invention of one of the present inventors, Robert Hall Smith, covered in co-pending application Serial No. 602,848, filed Apr. 2, 1932.

When single seated airplanes are operating from an aircraft carrier, either alone or in formation, the duties of the pilots are so multifarious as to preclude navigation by the ordinary methods. With the throttle and controls to operate, a lookout to be kept, instruments to be observed and signals to be exchanged, a pilot in a single seated plane has no time to manipulate a chart, parallel rulers and a pencil.

This device set forth herein is so arranged that with a minimum of settings, the airplane's bearing and distance from some fixed or movng base of operation will be indicated at all times. The weight and dimensions of the instrument are such that its use in an arplane is entirely feasible.

One of the most difficult problems in navigation that the pilot of a single seated airplane has to solve occurs when operating at a distance at sea, without landmarks and from a moving aircraft carrier. There are three factors affecting the relative position of the airplane to the carrier: the course and speed of the carrier, the force and direction of the wind, and the course and speed of the airplane. The solution of this problem is too complicated to make and rely on rough, quick calculations, and the importance of locating the carrier at the end of a flight, when the gas is almost exhausted, is too vital to permit of such practice. Furthermore, the duties of the pilot are so multifarious as to make it impossible for him to use the ordinary methods of navigational plotting. Hence, the urgency of supplying some means to perform this service is readily seen.

This invention accomplishes the determination of the bearing and distance of the airplane from the carrier at all times. The three factors as listed in the preceding paragraph are set on the machine, the machine started, changes in the factors are set on the machine at the time of their occurring, and the bearing and distance of the airplane from the carrier is indicated at all times.

An object of this invention is to provide an instrument of little weight and small dimensions that will indicate at all times the bearing and distance of an airplane from an aircraft carrier from which it operates.

A second object is to provide a self-driven instrument for indicating the relative position of an airplane and the carrier from which it is operating, upon which the three factors affecting their positions can be set by suitable knobs and dials.

With the above and other objects in view, this invention consists of such construction and arrangement of parts as will be described more fully hereinafter in connection with the accompanying drawings, in which.

Figure 1:
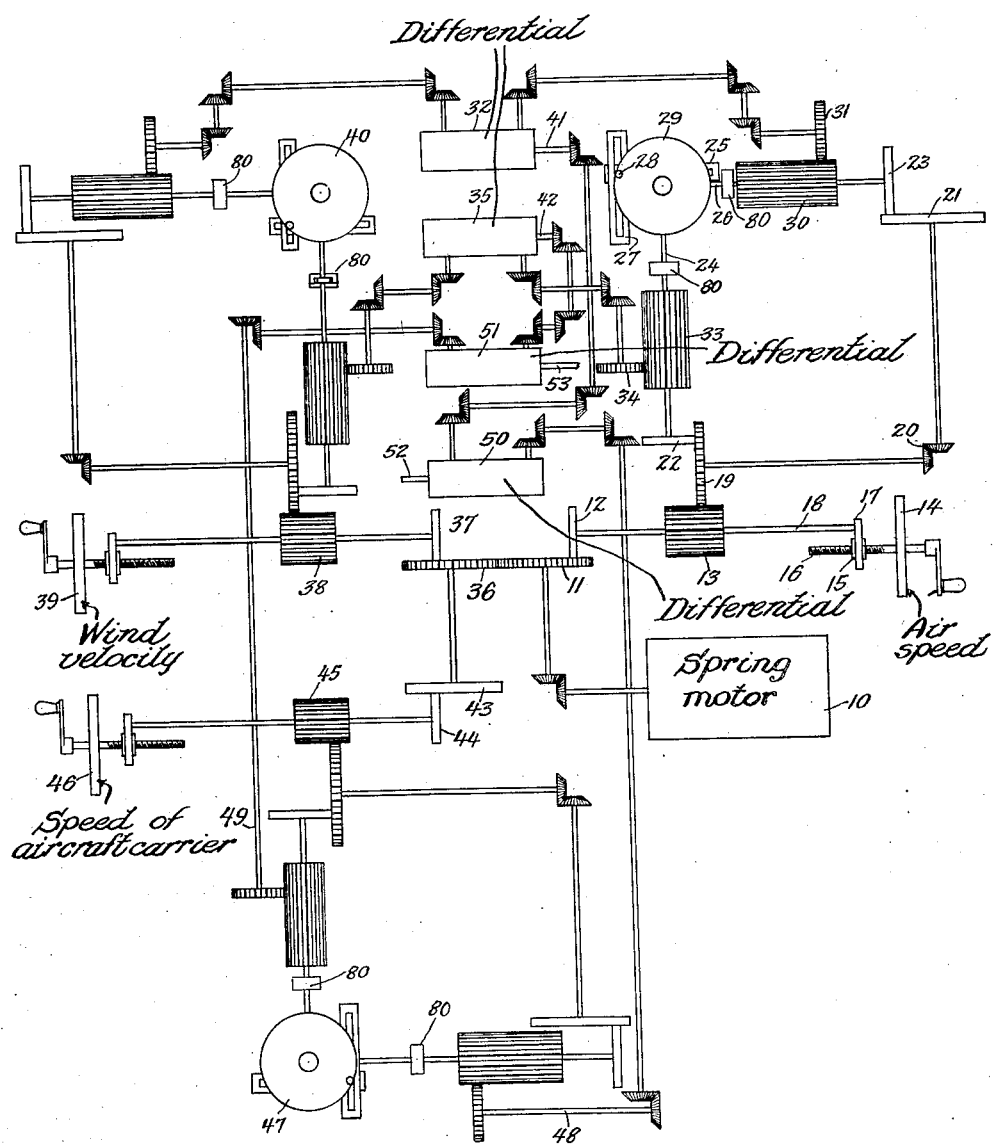
Fig. 1 is a diagrammatic sketch of the apparatus for producing motions proportionate to the three involved factors, resolving these factors into X and Y components at right angles to each other and combining corresponding components.

In Fig. 1, the spring motor 10 is controlled accurately as to speed, as a clock-work mechanism, and is the driving power of the entire apparatus. It drives the disk 11 at a constant speed which in turn by friction drives wheel 12 at a speed proportionate to its setting which may be varied from the center to the outside edge of the disk. The cog wheel 13 is sufficiently wide to permit this movement. The adjustment is made in accordance with the air speed of the airplane as indicated on the dial on wheel 14. As wheel 14 is turned, the nut 15 moves along shaft 16, and the collar 17 being connected to shaft 18, moves the wheel 12.

Having produced a motion proportionate to the speed of the airplane, the next step is to resolve it into two components, X and Y. The disk 19 engages cog wheel 13 and through beveled gear 20 drives disk 21. The Y component of the airplane's motion is taken from the disk 19 by a friction wheel 22, and the X component from disk 21 by friction wheel 23. Wheel 22 through shaft 24 is connected with slotted yoke 25, and wheel 23 through shaft 26 is connected to slotted yoke 27. Slotted yoke 25 slides over slotted yoke 27, and the crank 28 attached to disk 29 projects down through the slots of both yokes. It is readily seen that, as disk 29 is turned carrying crank 28 through an angle, the exact X component of the motion is imparted to wheel 23 and the exact Y component of the motion is imparted to wheel 22. When crank 28 is at the top of disk 29, as seen in Fig. 1, wheel 22 is at its maximum radius on toothed disk 19, while wheel 23 is at the center of disk 21. This corresponds to a course of zero or due north, and the motion is all in the Y direction with none in the X direction. Disk 29 is graduated from zero to 360° and it is thus seen that as crank 28 is set to the angle corresponding to the course of the airplane, its motion is resolved through wheels 23 and 22 into the proper X and Y components. The X motion is taken from cog wheel 30 by a cog wheel 31 and through appropriate beveled gears is connected to differential 32. The Y motion is taken from cog wheel 33 by cog wheel 34 and through appropriate beveled gears is connected to differential 35. The cog wheels 30 and 33 are wide enough to permit the full movement of wheels 33 and 32 across the faces of disks 21 and 19 respectively. Each slotted yoke is connected to its corresponding shaft by a swivel joint 80.

The next step is to produce a movement that bears the same relation to the force of the wind as the first produced motion bears to the air speed of the airplane. This is then split up into X and Y components and combined according to algebraic signs with the X and Y components respectively of the airplane.

This is accomplished by engaging toothed disk 11 by a similar toothed disk 36 which will be driven at the same constant speed. This in turn drives wheel 37 at a speed proportional to its setting which may be varied from the center to the outside edge of the disk. The cog wheel 38 is sufficiently wide to permit this movement and the adjustment is made in accordance with the force of the wind as indicated on the dial on wheel 32. The apparatus in its operation is similar to that used by setting the airplane speed by wheel 14. The direction of the wind is similarly set on disk 40 as the airplane course is set on disk 29. The motion representing the force of the wind is split up into its X and Y components by apparatus similar to that used in splitting up the motion of the airplane, as may be seen by reference to Fig. 1. These X and Y components are likewise connected by suitable gears to differentials 32 and 35 respectively. Differential 32 combines the two X components algebraically, and differential 35 does the same for the Y components. The result of these two X components is taken from the differential by shaft 41, and the corresponding resultant Y component from its differential by shaft 42. These shafts, through suitable gears, are connected to differentials 50 and 51 respectively.

A motion corresponding to that of the aircraft carrier is produced through disk 43 which, being connected directly to disk 36, has the same constant speed as disk 11. Disk 43 drives wheel 44 at a speed which is proportionate to its setting, which may be varied from the center to the outside edge of the disk. Cog wheel 45 is sufficiently wide to permit this movement and the adjustment is made in accordance with the speed of the aircraft carrier as is indicated on the dial on wheel 46. The apparatus and its operation is similar to that used in setting the airplane speed by wheel 14. The course of the aircraft carrier is similarly set on disk 47 as the airplane course is set on disk 29. The motion representing the speed of the carrier is split up into its X and Y components by apparatus similar to that used in splitting up the motion of the airplane, as may be seen in Fig. 1. The X component of the carrier's motion is taken from shaft 48, and the Y component from shaft 49. These shafts, through suitable gears, are connected to differentials 50 and 51 respectively. Differential 50 combines the algebraic resultant of the first two X components to the third X component algebraically, the sign of the third component having been reversed, and differential 51 does the same for the Y components. The resultant of the three X components is then taken from differential 50 by shaft 52, and the corresponding resultant of the three Y components from the differential 51 by the shaft 53. These shafts, through suitable gears, move the airplane's X and Y wires, as seen in Fig. 2.

It is clear that the speed of the aircraft carrier will have to be applied to the position of the airplane in the opposite sense, that is, in a direction 180 degrees from its true course. This is necessary since the aircraft carrier is considered as standing still, that is, it is set back along the reverse of its course a distance equal to the product of its speed and the elapsed time from zero hour or the time of starting. To maintain the relative position of the airplane to the carrier, the position of the airplane must be correspondingly set back. In addition to the method described above, this could be accomplished by graduating disk 47 to differ 180° from the graduations of corresponding positions on disks 29 and 40.

Figure 2:
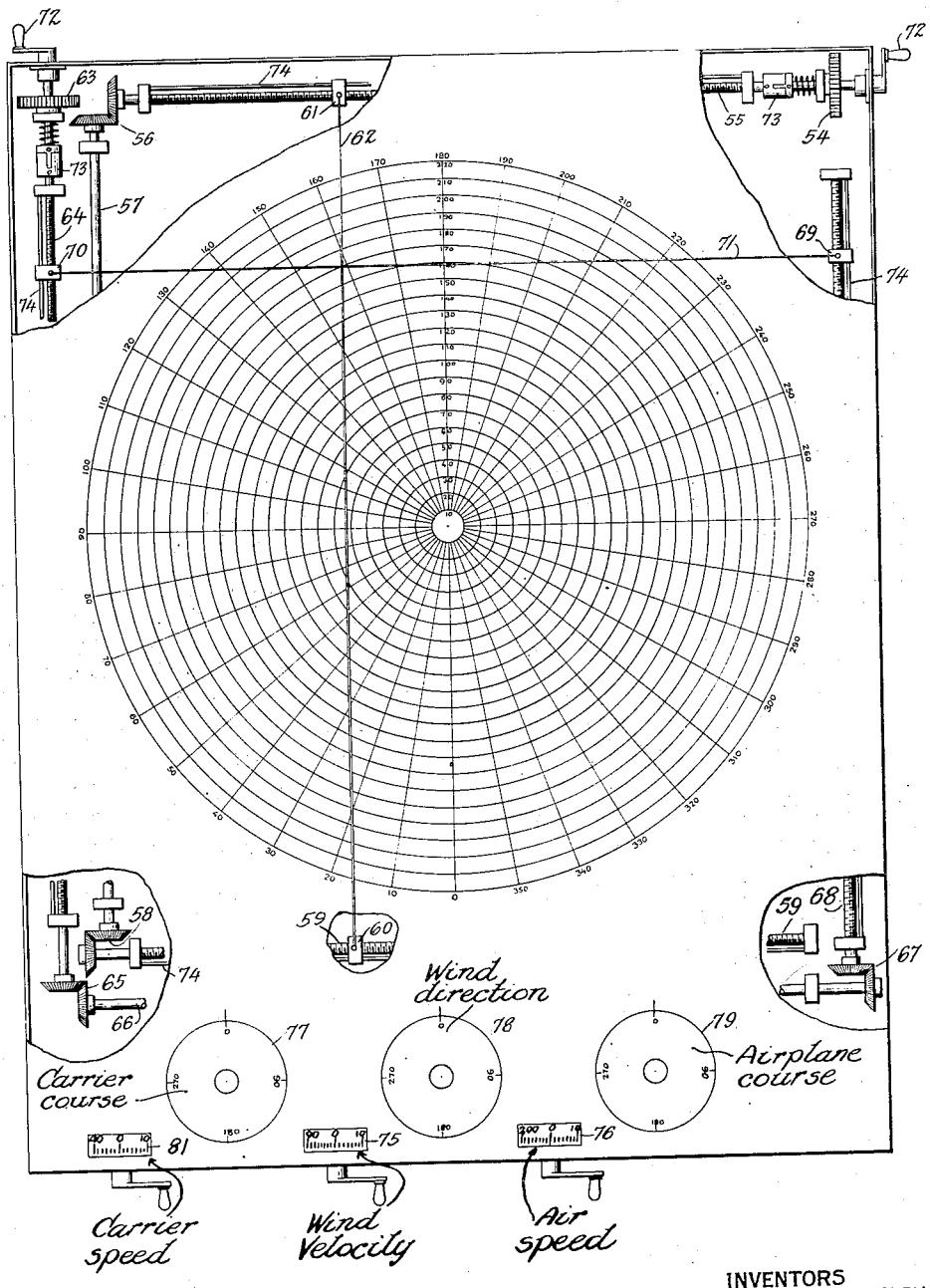
Fig. 2 is a diagrammatic sketch showing the apparatus for applying and indicating the motions of the airplane relative to the aircraft carrier, together with disks and knobs for setting the three involved factors on the instrument.

This apparatus is arranged to be used with a mooring or plotting board, as seen in Fig. 2. The gear ratios of the instrument must be such that the resultant motion of the X and Y wires in Fig. 2 will correspond to the scale of the mooring board in use. The scales on wheels 14, 39 and 46 may be replaced with others calibrated in accordance with the scales of other mooring boards.

The apparatus in Fig. 2 is arranged with a glass cover to which a mooring board, with bearing radii and distance circles marked thereon, may be secured so that a light from below, not shown, will render the position of the X and Y wires visible from above. The reference vessel is considered as being stationary at the center of the mooring board, and the three factors affecting the relative position of the airplane to the reference vessel are applied to the X and Y wires. The intersection of the wires, then, will indicate at all times the bearing and distance of the airplane from the reference vessel, but will not indicate the geographical location of either. However, with airplanes operating from a carrier, the general geographical location will be known, and the important thing to know exactly, is how to get back to the carrier.

The X and Y wires are extended between nuts that travel on threaded shafts. These shafts are caused to rotate by the mechanism of Fig. 1. The shaft 52, Fig. 1, through suitable gears, drives a cog wheel, not shown, which engages cog wheel 54, Fig. 2, thereby driving threaded shaft 55 which, in turn, through beveled gears 56, shaft 57 and beveled gears 58, drives threaded shaft 59. The beveled gear ratios being unity, shafts 55 and 59 rotate at the same speed and are so threaded that nuts 60 and 61 move uniformly as regards speed and direction, carrying the X wire 62 so as to maintain it constantly parallel to its initial position. The shaft 53, Fig. 1, through suitable gears drives a cog wheel, not shown, which engages cog wheel 63, Fig. 2, thereby driving threaded shaft 64 which, in turn, through beveled gears 65, shaft 66 and beveled gears 67 drives threaded shaft 68. The beveled gear ratios being unity, shafts 64 and 68 rotate at the same speed and are so threaded that nuts 69 and 70 move uniformly as regards speed and direction, carrying the Y wire 71 so as to maintain it constantly parallel to its initial position which is at right angles to wire 62. The guides 74 allow the wire carrying nuts longitudinal motion but prevent their turning on their respective shafts. Thus it will be seen that, the X wire being moved in accordance with the combined X components of the three factors and the Y wire 71 being moved in accordance with the three Y components, the intersection of these two wires moves in accordance with the vector combination of the three factors that affect the relative positions of the airplanes and the reference vessel.

Normally the airplane will start from the carrier and the instrument will be set so that the intersection of wires 62 and 71 is at the center of the mooring board. To do this, handles 72 and clutches 73 are provided with the mechanism that moves each wire. In setting the X wire, pull cog wheel 54 to the right, disengaging it from the cog wheel which drives it, and crank it as necessary to move the X wire 62 to the desired initial position. The operation of setting the Y wire is exactly similar. A description of the clutch will be found in the co-pending application of one of the present inventors, Robert Hall Smith, Serial No. 602,848, and forms no part of this invention.

The speed dials 14, 39 and 46, Fig. 1, will be arranged conveniently near the front of the instrument, as shown by 81, 75 and 76, and the course or direction disks 29, 40 and 47 will be controlled by conveniently arranged dials 77, 78 and 79. When these have all been set, the motor 10 will be started. As changes occur in the factors set on the machine, the proper dials will be correspondingly adjusted. The intersection of the wires 62 and 71 will then follow the consecutive positions of the airplane with respect to the carrier that is considered stationary at the center of the mooring board. By reference to the radial lines on the mooring board, the bearing of the airplane from the reference vessel, or vice versa, can be readily known, and by reference to the distance circles the distance between the airplane and the carrier is seen. Of course, this bearing is not the proper course to steer to intercept the carrier, as account must be taken of the course and speed of the carrier. But an attempt should be made to put the airplane on a collision course, the same being set on the instrument. If successful, as the airplane approaches the carrier the bearing will not change, but if the bearing increases or decreases, the course should be changed accordingly until the bearing is constant and then maintained until the carrier is sighted.

While in the foregoing there has been illustrated and described such combination and arrangement of elements as constitute the preferred embodiment of our invention, it is nevertheless desired to emphasize the fact that interpretation of the invention should be conclusive only when made in the light of the subjoined claims.

The invention described herein may be manufactured and used by or for the Government of the United States of America for governmental purposes without the payment to us of any royalties thereon.

We claim:

1. A navigational instrument, comprising means for producing a first, second and third motion, means mechanically cooperating with said first named means for varying each of said three motions, means mechanically cooperating with said first named means for associating with each of said motions a separate predetermined direction causing them to be resolved into motions proportional to components along mutually normal X and Y axes, means mechanically cooperating with said first named means for algebraically combining the X components and the Y components of the first and second motions, means mechanically cooperating with said first named means for combining the X component and the Y component of said third motion in opposite sense with said corresponding combined X and Y components of said first and second motions, a first and second wire substantially at right angles to each other, means mechanically cooperating with said combining means for causing said first wire to move parallel to itself as a function of said combined X components, and means mechanically cooperating with said combining means for causing said second wire to move as a function of said combined Y components whereby the intersection of said first and second wires moves as a function of the resultant of the three motions combined as described above.

2. A navigational instrument, comprising a constant speed motor, three constant speed primary disks driven by said motor, a primary friction wheel adjustable radially of each primary disk, a first, second and third pair of secondary disks driven respectively by said primary friction wheels, a first, second and third set of secondary friction wheels adjustable radially of corresponding secondary disks, first and second differentials for combining corresponding motions from said first and second sets of secondary friction wheels, and third and fourth differentials for combining corresponding motions from said third set of friction wheels with said combined corresponding motions from said first and second differentials.

3. A navigational instrument, comprising a constant speed motor, three constant speed primary disks driven by said motor, a primary friction wheel driven by each primary disk, means for adjusting each said primary friction wheel radially of its primary disk respectively in accordance with the speed of an airplane, the force of the wind and the speed of a reference vessel, a first, a second and a third pair of secondary disks driven respectively by said primary friction wheels, a first, a second and a third pair of secondary friction wheels driven by corresponding secondary disks and shiftable radially thereover, three double slotted yoked crank mechanisms adapted to convert circular motion into rectilinear motion in two directions at right angles to each other for adjusting each respective pair of secondary friction wheels radially of said corresponding secondary disks in accordance with the course of an airplane, the direction of the wind and the course of a reference vessel, a first and second differential for combining corresponding parallel components from said first and second pairs of friction wheels, and a third and a fourth differential for combining corresponding components from said first and second differentials and said third pair of secondary friction wheels.

ROBERT HALL SMITH.
JOHN P. W. VEST.